(12) United States Patent
Hanaoka

(10) Patent No.: US 10,091,370 B2
(45) Date of Patent: Oct. 2, 2018

(54) EXTERNAL STORAGE MEDIUM PROCESSING DEVICE AND PROGRAM

(71) Applicant: SEIKO EPSON CORPORATION, Tokyo (JP)

(72) Inventor: Yusuke Hanaoka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/872,173

(22) Filed: Jan. 16, 2018

(65) Prior Publication Data
US 2018/0220019 A1    Aug. 2, 2018

(30) Foreign Application Priority Data

Jan. 30, 2017   (JP) ................................ 2017-013924

(51) Int. Cl.
| | |
|---|---|
| *G06F 3/12* | (2006.01) |
| *H04N 1/00* | (2006.01) |
| *G06F 3/06* | (2006.01) |
| *G06F 9/4401* | (2018.01) |
| *G06F 13/42* | (2006.01) |
| *H04N 1/32* | (2006.01) |
| *G06F 13/38* | (2006.01) |

(52) U.S. Cl.
CPC ......... *H04N 1/00477* (2013.01); *G06F 3/065* (2013.01); *G06F 3/0625* (2013.01); *G06F 3/0634* (2013.01); *G06F 3/0679* (2013.01); *G06F 9/442* (2013.01); *G06F 13/385* (2013.01); *G06F 13/4282* (2013.01); *H04N 1/00339* (2013.01); *H04N 1/00928* (2013.01); *H04N 1/32122* (2013.01); *G06F 2213/0042* (2013.01); *H04N 2201/0081* (2013.01); *H04N 2201/0082* (2013.01)

(58) Field of Classification Search
CPC ........... H04N 1/00477; H04N 1/00339; H04N 1/00928; H04N 1/32122; H04N 2201/0081; H04N 2201/0082; G06F 3/0625; G06F 3/0634; G06F 3/065; G06F 3/0679; G06F 9/442; G06F 13/385; G06F 13/4282; G06F 2213/0042
USPC ........................................................ 358/1.15
See application file for complete search history.

(56) References Cited

U.S. PATENT DOCUMENTS

| | | | |
|---|---|---|---|
| 2008/0144120 A1* | 6/2008 | Katahira .............. | H04N 1/0035 358/401 |
| 2011/0080611 A1* | 4/2011 | Komatsu ............... | G06F 3/1204 358/1.15 |
| 2011/0255133 A1* | 10/2011 | Pastor ................. | G06K 15/4005 358/1.16 |
| 2017/0315799 A1* | 11/2017 | Kawaguchi ............. | H04N 1/00 |

FOREIGN PATENT DOCUMENTS

JP     2012-070432 A     4/2012

* cited by examiner

*Primary Examiner* — Neil R McLean

(57) ABSTRACT

An external storage medium processing device includes a plurality of receiving units to and from which the external storage medium can be attached and detached. Further, when detecting that the external storage medium is attached to the receiving unit at the time of startup, a control unit collates identification information stored in a storage unit with identification information acquired from the external storage medium. A notification unit does not perform notification of attachment if identification information is matched and, if not, performs notification of attachment.

12 Claims, 2 Drawing Sheets

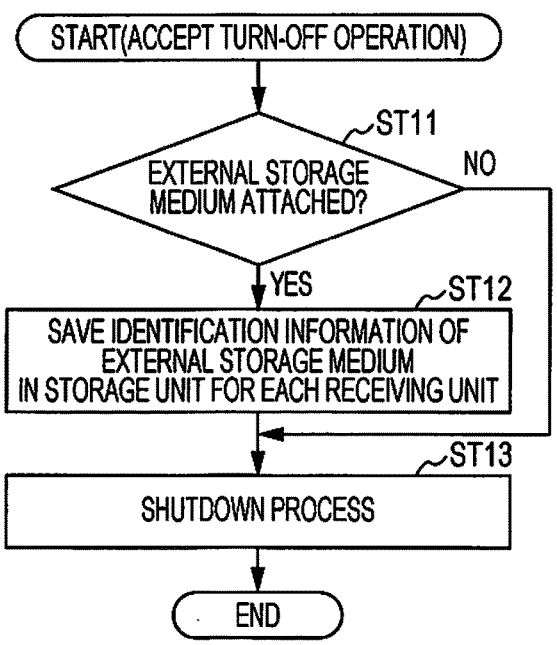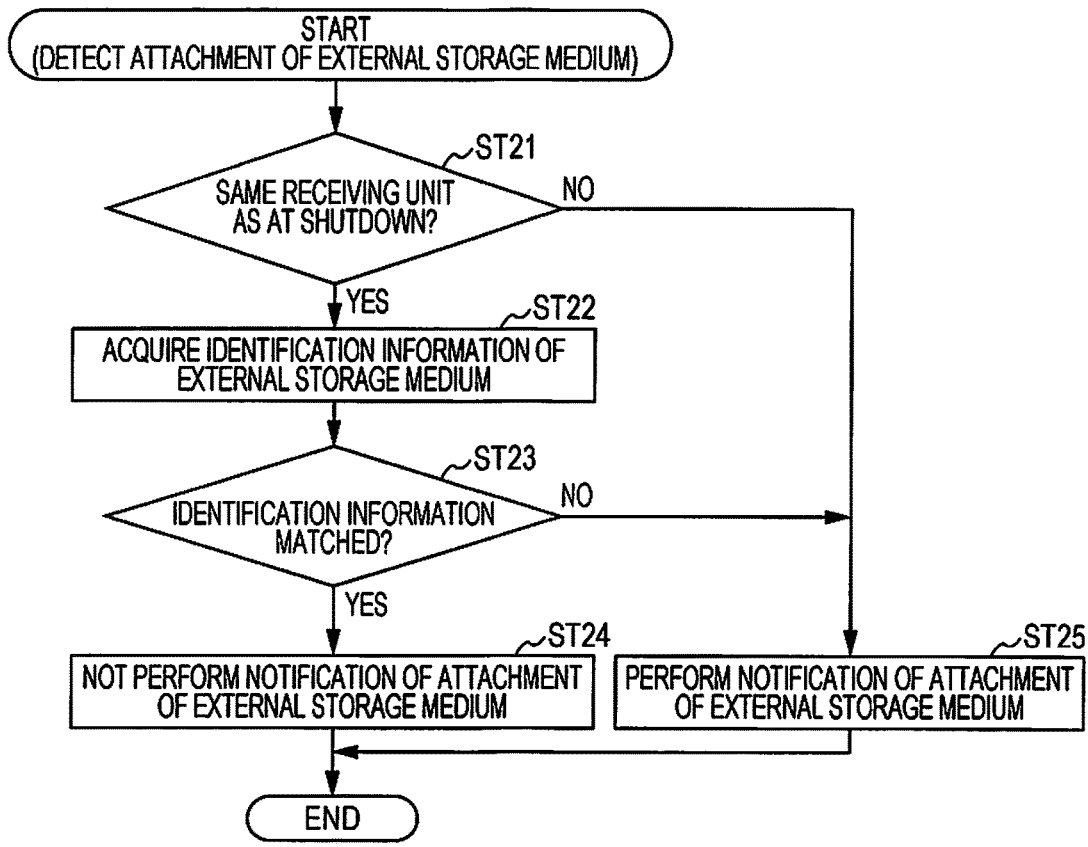

EXTERNAL STORAGE MEDIUM PROCESSING DEVICE AND PROGRAM

BACKGROUND

1. Technical Field

The present invention relates to an external storage medium processing device to and from which an external storage medium can be attached and detached and relates to a program.

2. Related Art

In a device having a USB port, a card slot, or the like which can be connected to a removable external storage medium, in response to an external storage medium being attached to the USB port or inserted into the card slot, the external storage medium is identified, and notification of attachment is provided to notify a user of the attachment or insertion of the external storage medium. For example, a notification of attachment is made by displaying a notification message on an operation panel or a display or by displaying a menu window used for an operation of a data file stored on the external storage medium.

In the present specification, an external storage medium refers to a non-volatile storage medium which is externally attachable to a communication port of a particular standard, such as a USB port, and a non-volatile storage medium such as a disk drive or a memory card embedded in or externally connected to a device. Examples of such an external storage medium may include a flash memory such as a USB memory or an SD card, an externally attached HDD, an externally attached SSD, and the like. Further, examples of such an external storage medium may include an optical disk such as a CD or a DVD.

The related art discloses an image processing device which can be connected to a removable external storage medium (see, for example, JP-A-2012-70432). The image processing device of the related art is a copier machine having a copying function and a printing function. A plurality of USB memories can be attached to and detached from the image processing device, and whether or not the USB memory is attached is determined via a USB host I/F unit. When a USB memory is newly attached, the device communicates with the attached USB memory, registers information on the attached USB memory to an address book, and displays the attached USB memory as a destination list of image data.

In a device having a receiving unit (for example, a USB port, a card slot, or the like) to and from which an external storage medium can be attached and detached, when the device is turned off with the external storage medium attached to the receiving unit, recognition of the external storage medium is performed when the device is next turned on, and thus the same notification as in the case where an external storage medium is newly attached is performed every time the device is turned on. There is no problem in performing such notification when a user newly attaches an external storage medium when turning on the device. However, an external storage medium might have been attached before the device was turned off. For example, in order to store data on a shared external storage medium, such an external storage medium may be left attached. In such a case, it is unnecessary to perform notification of attachment every time the device is turned on, because the external storage medium was not newly attached when the device is turned on, and such unnecessary notification is likely to obstruct user operation.

SUMMARY

An advantage of the invention is to provide a better device.

An external storage medium processing device according to one aspect of the invention includes: a receiving unit to and from which an external storage medium can be attached and detached; a storage unit that stores identification information on the external storage medium; and a notification unit that does not perform notification of attachment of the external storage medium when identification information of the external storage medium attached to the receiving unit at a time of startup is the same as identification information stored in the storage unit, and performs notification of attachment of the external storage medium when the identification information of the external storage medium attached to the receiving unit at a time of startup is not the same as the identification information stored in the storage unit.

Further, another aspect of the invention is a program that causes a computer to operate which is able to communicate with an external storage medium attached to a receiving unit. The program causes the computer to execute: a determination process for communicating with the external storage medium attached to the receiving unit at a time of startup of the computer and determining whether or not identification information of the external storage medium is the same as pre-stored identification information; and a notification process for not performing notification of attachment of the external storage medium when identification information of the external storage medium attached to the receiving unit at a time of startup is the same as the pre-stored identification information, and performing notification of attachment of the external storage medium when the identification information of the external storage medium attached to the receiving unit at a time of startup is not the same as the pre-stored identification information.

According to the invention, when an external storage medium is attached at the time of startup, it is determined whether or not to perform notification of attachment of the external storage medium in accordance with identification information of the external storage medium. That is, no notification of attachment is performed for the external storage medium having identification information which matches the identification information stored in the storage unit. Thereby, it is possible to avoid performing notification of attachment when the same external storage medium as that attached before the startup is attached. On the other hand, it is possible to perform notification of attachment when a different external storage medium from that attached before the startup is attached. Therefore, since unnecessary notification of attachment can be avoided at the time of startup, user operation is less likely to be obstructed. Further, it is possible to omit only unnecessary notification of attachment and prevent omission of necessary notification of attachment.

The identification information may be a checksum corresponding to a data file stored on the external storage medium. This enables determination as to whether or not the external storage medium is the same as before in accordance with whether or not the content of a data file stored on the external storage medium is the same as before. It is therefore possible to prevent notification of attachment from being performed when there is no change in the content of the data file.

It is desirable that, when the external storage medium is newly attached during a usual operation, the notification unit perform the notification of attachment regardless of the identification information. This can prevent omission of necessary notification of attachment.

It is desirable that a plurality of receiving units be provided and the storage unit store the identification information in association with the receiving units. It is therefore possible to prevent only unnecessary notification of attachment from being performed without omission of necessary notification of attachment.

It is desirable that the identification information of the external storage medium attached to the receiving unit be stored in the storage unit at a time of shutdown. Thereby, information required to determine whether or not to perform the notification of attachment at the time of startup can be maintained.

BRIEF DESCRIPTION OF THE DRAWINGS

The invention will be described with reference to the accompanying drawings, wherein like numbers reference like elements.

FIG. 3 is a flowchart illustrating control at the time of turn-off.

FIG. 4 is a flowchart of notification of attachment of an external storage medium at the time of turn-on.

DESCRIPTION OF EXEMPLARY EMBODIMENTS

Embodiments of an external storage medium processing device to which the invention is applied will be described below with reference to the drawings.

Figure 1:
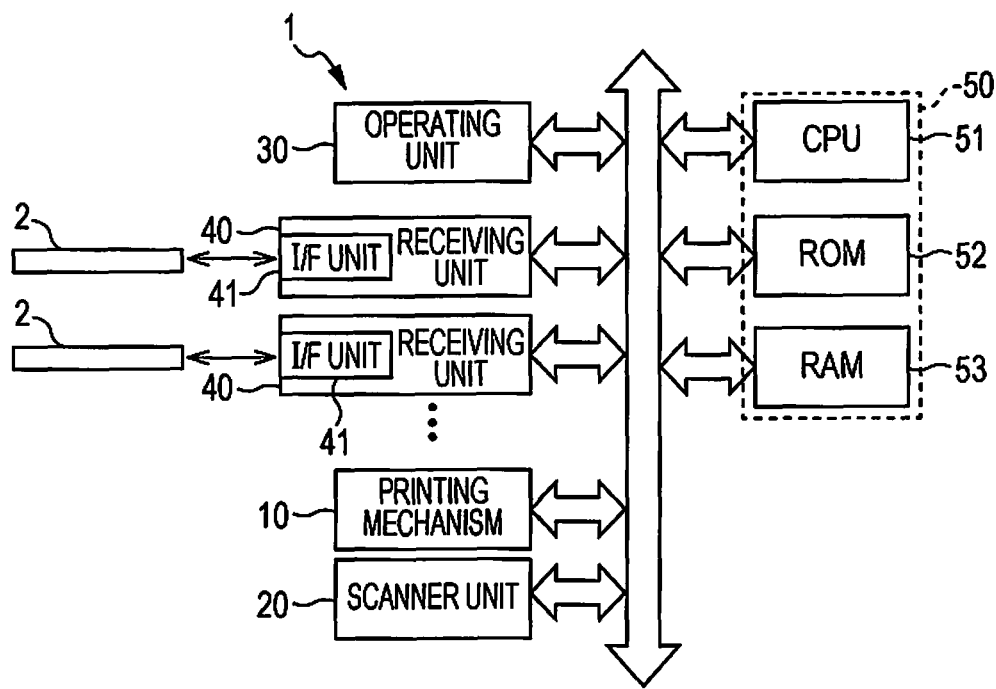
FIG. 1 is a block diagram of an external storage medium processing device to which the invention is applied.

FIG. 1 is a block diagram of an external storage medium processing device 1 to which the invention is applied. The external storage medium processing device 1 is a copier machine having a printing mechanism 10 and an optical scanner unit 20 and further includes an operating unit 30 used for various settings or operations and receiving units 40 to and from which an external storage medium 2 can be attached and detached. The operating unit 30 is an operating panel having a liquid crystal display screen. Further, the operating unit 30 may have a touch panel on which a touch entry is made by a touch operation performed on a display screen. Further, in addition to or instead of a touch panel, an input unit or a display unit may be provided. For example, an operating keypad or an operating switch, an LED lamp, or the like may be provided.

The external storage medium processing device 1 has a control unit 50 that controls the printing mechanism 10 and the scanner unit 20 to perform reading or printing of a document. In response to operation entry received from the operating unit 30, the control unit 50 causes the printing mechanism 10 to print image data generated from a scan of a document by using the scanner unit 20 in order to copy the document. Further, once print job data is received from the outside, the control unit 50 controls the printing mechanism 10 in accordance with the received print job data to perform printing of content specified by the print job data. Further, the external storage medium processing device 1 may have a facsimile function that scans a document by using the scanner unit 20 to generate image data and transmits the generated image data to a destination specified via the operating unit 30 and that also prints received fax data.

The external storage medium processing device 1 has a plurality of receiving units 40. Each of the plurality of receiving units 40 has an I/F unit 41 that detects attachment of the external storage medium 2 and notifies the control unit 50 of the detection. The external storage medium 2 connected to the receiving unit 40 is connected to the I/F unit 41. The I/F unit 41 determines the type of the connected external storage medium 2. Further, when the external storage medium 2 is detached from the receiving unit 40 or when the external storage medium 2 is attached to the receiving unit 40, the I/F unit 41 detects the removal or the attachment and notifies the control unit 50 of the detection. The control unit 50 communicates with the external storage medium 2 via the I/F unit 41 and acquires information from the external storage medium 2. For example, the control unit 50 acquires information such as the storage medium name, a stored data file, updated date and time, or the like from the external storage medium 2.

The control unit 50 reads image data from the external storage medium 2 via the I/F unit 41 in accordance with an operation entry received from the operating unit 30 and prints the read image data. Further, when data can be written to the external storage medium 2, the control unit 50 writes data to the external storage medium 2 via the I/F unit 41. For example, a document is scanned by the scanner unit 20 and the generated image data is written to the external storage medium 2. Further, other data may be written to the external storage medium 2. For example, image data generated from FAX data may be written to the external storage medium 2.

The external storage medium 2 is a non-volatile storage medium, which may be, for example, a flash memory such as a USB memory or an SD card or an externally attached HDD or SSD, as described above. Further, the external storage medium 2 may be an optical disk. The receiving unit 40 is configured in accordance with the type of the external storage medium 2, which may be, for example, a communication port such as a USB port or a card slot into which an SD card can be inserted. Further, the receiving unit 40 may be an optical drive. The plurality of receiving units 40 may include different types. For example, the plurality of receiving unit 40 may include a USB port and a card slot.

The control unit 50 has a CPU 51, a ROM 52 that is a non-volatile memory, and a RAM 53 that is a volatile memory. Further, the control unit 50 may have one or a plurality of ASICs, signal processing circuits, or the like instead of or in addition to the CPU 51. The CPU 51, the ASIC, the signal processing circuit, and the like are collectively referred to as a processor. Alternatively, an HDD that stores therein received data or scanned data of a document may be provided. The control unit 50 performs various processes by using hardware and software together. For example, the control unit 50 performs a process by using the CPU 51 to read a firmware program or the like stored in the ROM 52 or the RAM 53, performs a process by using a function implemented in an ASIC, or performs a process by using a signal processing circuit to perform signal processing.

Figure 2:
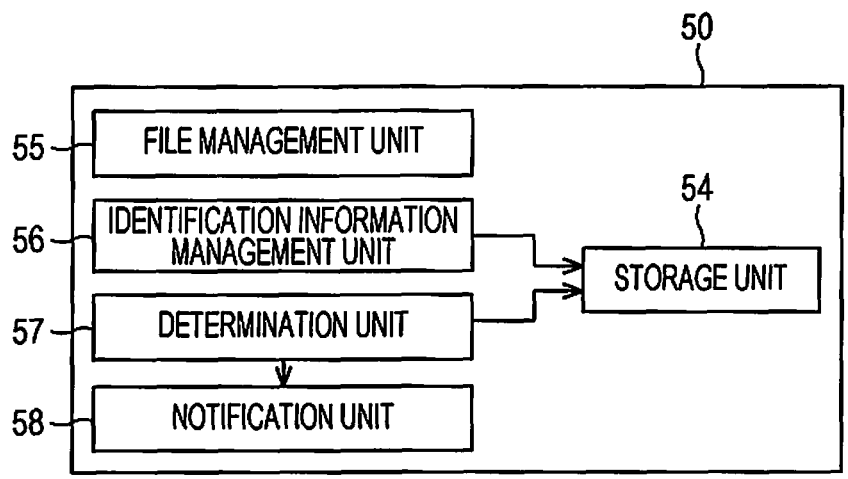
FIG. 2 is a functional block diagram of a control unit.

FIG. 2 is a functional block diagram of the control unit 50. The control unit 50 has a storage unit 54 that is a storage area provided in the non-volatile memory. Further, the control unit 50 has a file management unit 55, an identification information management unit 56, a determination unit 57, and a notification unit 58. The functions thereof are implemented by the CPU 51 executing a program stored in the ROM 52. The file management unit 55 performs file access to the external storage medium 2 and is able to handle a FAT file system, for example. On the external storage medium 2, data is stored according to a FAT file system format. Note that, when data is stored on the external storage medium 2 according to a file system other than a FAT file system, the file management unit 55 can handle such a file system.

The storage unit 54 is a storage area that stores therein identification information of the external storage medium 2. The identification information management unit 56 performs an identification information saving process when the external storage medium processing device 1 is turned off. The identification information saving process is a process of generating identification information based on information of the external storage medium 2 attached to the receiving unit 40 and storing the identification information in the storage unit 54. The identification information saving process may be a process of storing the information of the external storage medium 2 attached to the receiving unit 40 as it exists in the storage unit 54 as identification information. In the present embodiment, a plurality of receiving units 40 are provided. Therefore, identification information of the attached external storage medium 2 is stored in association with the corresponding receiving unit 40 used for the attachment. For example, when the receiving units 40 has a plurality of communication ports, attachment of the external storage medium 2 is detected for each communication port, and identification information of the external storage medium 2 is stored for the corresponding communication port.

Control at Turn-off

FIG. 3 is a flowchart illustrating control at the time of turn-off. In response to an operation of turning off the external storage medium processing device 1 (for example, pressing down a power button), the control unit 50 starts the process of the flowchart in FIG. 3. In steps ST11 to ST 12, the identification information management unit 56 performs the identification information saving process described above. First, in step ST11, it is determined whether or not the external storage medium 2 is attached. If there is at least one receiving unit 40 to which the external storage medium 2 is attached (step ST11: Yes), step ST12 is entered. In step ST12, the identification information management unit 56 acquires identification information from the external storage medium 2 attached to the receiving unit 40 and stores the acquired identification information in the storage unit 54 in association with the receiving unit 40 to which the external storage medium 2 is attached. For example, identification information of the external storage medium 2 attached to a communication port is acquired, and this identification information is stored in the storage unit 54 in association with the communication port number. In step ST12, if several external storage media 2 are attached to the multiple receiving units 40, the identification information management unit 56 performs the above process for each of the receiving units 40. Step ST13 is then entered.

In step ST13, the control unit 50 performs a shutdown process in order to safely turned off the external storage medium processing device 1. For example, an on-going operation or program is terminated, and the external storage medium processing device 1 is then turned off. Further, if no external storage medium 2 is detected in step S11 (step ST11: No), step ST13 is entered. That is, when no external storage medium 2 is attached, the shutdown process is performed without storing identification information in the storage unit 54.

Note that, upon startup of the external storage medium processing device 1, the identification information management unit 56 deletes identification information stored in the storage unit 54 at a predetermined timing. For example, when attachment of the external storage medium 2 is detected at the startup of the external storage medium processing device 1 and when there is identification information associated with the receiving unit 40 to which no external storage medium 2 is attached, this identification information is deleted. Further, when removal of the external storage medium 2 is detected in a usual operation and when there is identification information associated with the receiving unit 40 at which the removal of the external storage medium 2 is detected, the identification information is deleted.

Identification information may be a file configuration of a data file stored on the external storage medium 2, a medium name or the updated date and time of the external storage medium 2, information generated therefrom, or information of a combination thereof, for example. Such generation corresponds to calculation of a checksum or a hash value, for example. The file configuration may be a file configuration for only the data file whose type is handled by the external storage medium processing device 1. For example, when the external storage medium processing device 1 can handle only JPEG files, the identification information management unit 56 extracts JPEG files from data files stored on the external storage medium 2. A list of checksums generated for respective extracted JPEG files is stored in the storage unit 54 together with the medium name and the updated data and time of the external storage medium 2. When the medium name of the external storage medium 2 is "media01", the updated date thereof is "2017/01/01", and the checksums are "67" and "89" for two files stored; "media01-2017/01/01-67-89" may be acquired as identification information, or simply, "media01-2017/01/01" may be acquired as identification information.

Upon the detection of attachment of the external storage medium 2 to the receiving unit 40 when the external storage medium processing device 1 starts up following a turn-on operation, the determination unit 57 determines whether or not the identification information acquired from the external storage medium 2 is the same as the identification information stored in the storage unit 54. For example, a process for enabling communication of a plurality of communication ports at the time of startup of the external storage medium processing device 1 is performed, and, in this process, when attachment of the external storage medium 2 to a communication port is detected, the determination unit 57 reads identification information associated with the communication port from the storage unit 54. The storage unit 57 then collates and determines whether or not the identification information read from the storage unit 54 is the same as the identification information acquired from the external storage medium 2 detected as being attached to the communication port.

When the determination that the external storage medium 2 has been newly attached to the receiving unit 40 is notified from the I/F unit 41, the notification unit 58 performs predetermined notification of attachment. For example, a notification message such as "a new medium has been connected" indicating that the external storage medium 2 has been attached is displayed on the liquid crystal display screen of the operating unit 30. Alternatively, a menu window used for utilizing a data file stored on the external storage medium 2 or a selection window used for selecting a data file is displayed. Further, notification of attachment may be other types of display or may be other notification than visual notification, such as sounding indication of attachment when a speaker is provided.

When attachment of the new external storage medium 2 is detected at other timings than startup, that is, during a usual operation, the notification unit 58 performs notification of attachment. On the other hand, when attachment of the external storage medium 2 is detected at the time of startup, the notification unit 58 determines whether or not to perform notification of attachment based on collation result of the identification information transferred from the determination unit 57 as described below.

Notification of Attachment at Turn-on

FIG. 4 is a flowchart of notification of attachment of the external storage medium 2 at the time of turn-on. Upon the operation of turning on the external storage medium processing device 1, the control unit 50 performs a startup process of the external storage medium processing device 1. As described above, the startup process includes a process of enabling the receiving unit 40 to be used. Therefore, if the external storage medium 2 is attached to the receiving unit 40, such attachment is detected. In response to the detection of attachment of the external storage medium 2 to the receiving unit 40, the determination unit 57 starts the process of FIG. 4 during the startup process of the external storage medium processing device 1.

In steps ST21 to ST23, the determination unit 57 determines whether or not the identification information acquired from the external storage medium 2 currently attached to the receiving unit 40 is the same as the identification information stored in the storage unit 54 (collation of identification information). First, in step S21, the receiving unit 40 at which attachment of the external storage medium 2 is detected is the same receiving unit 40 as that was detected at the time of turn-off. For example, it is determined whether or not a communication port at which the external storage medium 2 is detected is the communication port at which the external storage medium 2 was attached at the time of turn-off. The determination in step ST21 is performed based on identification information stored in the storage unit 54, for example. That is, the identification information stored in the storage unit 54 is such information that identification information is associated with the receiving unit 40. It is therefore possible to determine whether or not the receiving unit 40 at which attachment of the external storage medium 2 is detected at the time of startup matches the receiving unit 40 whose identification information is stored. If the receiving unit 40 at which attachment of the external storage medium 2 is detected at the time of startup matches the receiving unit 40 whose identification information is stored (step ST21: Yes), step ST22 is entered.

In step ST22, the determination unit 57 acquires identification information from the external storage medium 2 detected at the time of startup. Subsequently, in step ST23, it is determined whether or not the identification information acquired in step ST22 is the same as the identification information read from the storage unit 54 for each receiving unit 40. If the identification information acquired in step ST22 is the same as the identification information read from the storage unit 54 (step ST23: Yes), step ST24 is entered. In step ST24, the notification unit 58 decides not to perform notification of attachment of the external storage medium 2 whose identification information is matched. On the other hand, if the identification information acquired in step ST22 is different from the identification information read from the storage unit 54 (step ST23: No), step ST25 is entered.

In step ST25, the notification unit 58 decides to perform notification of attachment of the external storage medium 2 and performs the notification of attachment. That is, when identification information (the name, the data configuration, or the like) of the external storage medium 2 at the time of shutdown is different from that at the time of startup, the notification unit 58 performs notification of attachment. Further, in step ST21, if the receiving unit 40 at which attachment of the external storage medium 2 is detected is not the same as that at the time of shutdown (step ST21: No), the process enters step ST25 to perform the notification of attachment. That is, when a user has detached and attached the external storage medium 2 from one of the receiving units 40 to another during a period of turn-off, notification of attachment is performed.

Effect and Advantage of the Embodiment

As discussed above, the external storage medium processing device 1 of the present embodiment stores in the storage unit 54 identification information of the external storage medium 2 attached to the receiving unit 40 at the time of turn-off. Then, at the time of startup, the external storage medium processing device 1 determines whether or not to perform notification of attachment of the external storage medium 2 based on identification information of the external storage medium 2 stored in the storage unit 54. That is, this means that, when identification information read from the storage unit 54 is the same as the identification information acquired from the external storage medium 2 detected at the time of startup, the external storage medium 2 which was attached to the receiving unit 40 at the time of turn-off is still attached to the same receiving unit 40. Therefore, in such a case, no notification of attachment is performed. Thereby, for the external storage medium 2 which remains attached for use, it is possible to prevent notification of attachment from being performed every time of startup. Therefore, user operation is not obstructed by unnecessary notification of attachment. Further, when the external storage medium 2 is newly attached or replaced with another external storage medium 2 during a period of turn-off or when a data content stored on the external storage medium 2 has been changed, matching of identification information is lost, and thus notification of attachment is performed. It is therefore possible to maintain convenience in using the external storage medium 2 which has been replaced with or whose data has been changed. It is thus possible to omit only unnecessary notification of attachment and prevent omission of necessary notification of attachment.

In the present embodiment, a checksum corresponding to a data file stored on the external storage medium 2 is used as identification information of the external storage medium 2. It is therefore possible to determine whether or not the external storage medium 2 is the same as before based on whether or not the content of the data file stored on the external storage medium 2 is the same as before. It is therefore possible to avoid performing notification of attachment when there is no change in the content of the data file.

In the present embodiment, when the external storage medium 2 is newly attached during a usual operation, notification of attachment is performed. Thus, since necessary notification of attachment can be performed without omission, convenience in using the external storage medium 2 is not reduced. Note that it may be possible not to perform notification of attachment depending on selection by user setting operation.

In the present embodiment, when a plurality of receiving units 40 to which an external storage medium can be attached are provided, identification information is stored in association with the receiving unit 40 at the time of shutdown, and matching determination of the identification information is performed for each of the receiving units 40 at the time of startup. Since whether or not notification of attachment is necessary can be determined for each external storage medium 2, only unnecessary notification of attachment can be avoided without omission of necessary notification of attachment.

In the present embodiment, identification information of the external storage medium 2 attached to the receiving unit 40 is stored in the storage unit 54 for each of the receiving units 40 at the time of shutdown, information required to determine whether or not to perform notification of attachment at the time of startup can be maintained.

Note that the identification information management unit 56 can also perform a process of storing identification information of the external storage medium 2 attached to the receiving unit 40 at other timings than shutdown. For example, the identification information can be stored in the storage unit 54 every time the external storage medium 2 is attached or the content thereof is changed during a usual operation. Further, when removal of the external storage medium 2 is detected, identification information of the detached external storage medium 2 is deleted from the storage unit 54. In this case, required identification information can be stored in the storage unit 54 for each of the receiving units 40 at the time of startup.

Other Embodiments

While the embodiment described above is to apply the invention to a copier machine, the invention can be applied to various devices having one or more receiving units to and from which the external storage medium 2 can be attached and detached. For example, the invention can be applied to a single-function printer or a single-function scanner having a SUB port or a card slot. Further, the invention can be applied to various computers, a method executed by a computer, or a program causing a computer to operate.

Further, the embodiment may be configured so that a user can select whether to perform notification of attachment based on identification information as described above, perform notification of attachment of the external storage medium 2 every time, or perform no notification of attachment of the external storage medium 2 at all.

Further, it is possible to perform notification by using sound every time but not to perform notification by using display in accordance with determination based on identification information. That is, when a plurality of schemes are used for notification of attachment, notification of attachment by using at least one of the schemes may not be performed.

What is claimed is:

1. An external storage medium processing device comprising:
   at least one receiving unit, including an opening, to and from which an external storage medium can be attached and detached;
   a storage unit including a memory that stores identification information of the external storage medium; and
   a notification unit including a processor that does not perform notification of attachment of the external storage medium when identification information of the external storage medium attached to the receiving unit at a time of startup is the same as identification information stored in the storage unit, and performs notification of attachment of the external storage medium when the identification information of the external storage medium attached to the receiving unit at a time of startup is not the same as the identification information stored in the storage unit,
   when the external storage medium is newly attached during a usual operation, the notification unit performing the notification of attachment regardless of the identification information.

2. The external storage medium processing device according to claim 1, wherein
   the identification information is a checksum corresponding to a data file stored on the external storage medium.

3. The external storage medium processing device according to claim 1, further comprising a plurality of receiving units,
   wherein the storage unit stores the identification information in association with the receiving units.

4. The external storage medium processing device according to claim 1, wherein
   the identification information of the external storage medium attached to the receiving unit is stored in the storage unit at a time of shutdown.

5. A non-transitory computer-readable medium with a program that causes a computer to operate, the computer being able to communicate with an external storage medium attached to a receiving unit, wherein the program causes the computer to execute:
   a determination process for communicating with the external storage medium attached to the receiving unit at a time of startup of the computer and determining whether or not identification information of the external storage medium is the same as pre-stored identification information; and
   a notification process for not performing notification of attachment of the external storage medium when identification information of the external storage medium attached to the receiving unit at a time of startup is the same as the pre-stored identification information, and performing notification of attachment of the external storage medium when the identification information of the external storage medium attached to the receiving unit at a time of startup is not the same as the pre-stored identification information,
   when the external storage medium is newly attached during a usual operation the notification of attachment being performed regardless of the identification information.

6. The non-transitory computer-readable medium according to claim 5, wherein
   the identification information is a checksum corresponding to a data file stored on the external storage medium.

7. The non-transitory computer-readable medium according to claim 5, wherein
   the receiving unit includes a plurality of receiving units, the identification information is stored in a storage unit in association with the receiving units.

8. The non-transitory computer-readable medium according to claim 5, wherein
   the identification information of the external storage medium attached to the receiving unit is stored in a storage unit at a time of shutdown.

9. An external storage medium processing device comprising:
   at least one receiving unit, including an opening, to and from which an external storage medium can be attached and detached;
   a storage unit including a memory that stores identification information of the external storage medium; and
   a notification unit including a processor that does not perform notification of attachment of the external storage medium when identification information of the external storage medium attached to the receiving unit at a time of startup is the same as identification information stored in the storage unit, and performs notification of attachment of the external storage medium when the identification information of the external storage medium attached to the receiving unit at a time of startup is not the same as the identification information stored in the storage unit, the identification information of the external storage medium attached to the receiving unit being stored in the storage unit at a time of shutdown.

10. The external storage medium processing device according to claim 9, wherein the identification information is a checksum corresponding to a data file stored on the external storage medium.

11. The external storage medium processing device according to claim 9, wherein when the external storage medium is newly attached during a usual operation, the notification unit performs the notification of attachment regardless of the identification information.

12. The external storage medium processing device according to claim 9, further comprising a plurality of receiving units, wherein the storage unit stores the identification information in association with the receiving units.

* * * * *